US012755032B2

(12) United States Patent
Ziemba et al.

(10) Patent No.: US 12,755,032 B2
(45) Date of Patent: Oct. 6, 2026

(54) ENABLING RDMA CLIENT AND SERVER RESOURCE ISOLATION IN A CONNECTIONLESS ENVIRONMENT

(71) Applicant: Hewlett Packard Enterprise Development LP, Spring, TX (US)

(72) Inventors: Ian Christian Ziemba, Baldwin, WI (US); Duncan Roweth, Bristol (GB); Keith D. Underwood, Powell, TN (US); Steven F. Welch, Dallas, TX (US)

(73) Assignee: Hewlett Packard Enterprise Development LP, Spring, TX (US)

( * ) Notice: Subject to any disclaimer, the term of this patent is extended or adjusted under 35 U.S.C. 154(b) by 28 days.

(21) Appl. No.: 18/749,249

(22) Filed: Jun. 20, 2024

(65) Prior Publication Data

US 2025/0390588 A1 Dec. 25, 2025

(51) Int. Cl.
*G06F 21/60* (2013.01)
*G06F 21/79* (2013.01)

(52) U.S. Cl.
CPC .......... *G06F 21/602* (2013.01); *G06F 21/606* (2013.01); *G06F 21/79* (2013.01)

(58) Field of Classification Search
CPC ....... G06F 21/602; G06F 21/606; G06F 21/79
See application file for complete search history.

(56) References Cited

U.S. PATENT DOCUMENTS

| | | | | |
|---|---|---|---|---|
| 8,321,566 | B2 * | 11/2012 | Schroeder, Jr. | G06F 9/468 370/452 |
| 10,523,675 | B2 | 12/2019 | Bhabbur et al. | |
| 2015/0095649 | A1 * | 4/2015 | Johnson | H04L 63/0227 713/171 |

(Continued)

FOREIGN PATENT DOCUMENTS

CN 107735817 A 2/2018

OTHER PUBLICATIONS

OpenFabrics Interfaces Working Group; "OFI Libfabric Programmer's Manual fi_domain man page"; Nov. 17, 2023; 13 pages.

(Continued)

*Primary Examiner* — Ayoub Alata
(74) *Attorney, Agent, or Firm* — Yao Legal Services, Inc.

(57) ABSTRACT

A system allows a first endpoint to communicate with a plurality of endpoints in a connectionless network environment by enabling, by the first endpoint, a plurality of authorization keys, a respective endpoint of the plurality of endpoints being associated with a respective authorization key. The first endpoint receives, from a second endpoint of the plurality of endpoints, a first request comprising an action, a remote procedure call, and a first authorization key associated with the second endpoint. The system validates the first authorization key by matching the first authorization key to an enabled authorization key. The system performs the action indicated and, responsive to performing the action, returns the first authorization key to a completion event queue. The system obtains the first authorization key (Continued)

from the completion event queue and transmits, to the second endpoint based on the obtained first authorization key, data associated with the first request.

20 Claims, 10 Drawing Sheets

(56) References Cited

U.S. PATENT DOCUMENTS

2018/0182191 A1 6/2018 Wagstaff

OTHER PUBLICATIONS

InfiniBandSM, "InfiniBandTM Architecture Specification vol. 1 Release 1.4", Apr. 7, 2020, 1981 Pages.
InfiniBandSM, "InfiniBandTM Architecture Specification vol. 2 Release 1.4", Apr. 7, 2020, 691 pages.
"Core: Support multiple auth keys per EP #9319", available online at <https://github.com/ofiwg/libfabric/pull/9319>, Sep. 12, 2023, 12 pages.
Libfabric-2.0: Tagged message enhancements, available online at <https://github.com/ofiwg/libfabric/issues/9020>, Jun. 9, 2023, 2 pages.
Github, "Libfabric Authorization Key Ring Proposal #9204", available online at <https://github.com/ofiwg/libfabric/discussions/9204>, Aug. 9, 2023, 8 pages.
Github, "Libfabric Programmer's Manual", available online at <https://ofiwg.github.io/libfabric/v1.9.1/man/fi_trigger.3.html>, 2023, 4 pages.
Github, "Support for max_ep_auth_key #9440", available online at <https://github.com/ofiwg/libfabric/pull/9440>, Oct. 14, 2023, 7 pages.
Github, "Support Multiple Authorization Keys per Endpoint #9476", available online at <https://github.com/ofiwg/libfabric/pull/9476>, Oct. 31, 2023, 4 pages.
Github, "util: Move FI_REMOTE/LOCAL_COMM to secondary caps #9475", available online at <https://github.com/ofiwg/libfabric/pull/9475>, Oct. 27, 2023, 3 pages.

* cited by examiner

ENABLING RDMA CLIENT AND SERVER RESOURCE ISOLATION IN A CONNECTIONLESS ENVIRONMENT

BACKGROUND

Field

Authorization keys may be used to limit communications between endpoints. Only peer endpoints programmed with the same authorization key may communicate with each other. In connectionless environments, such as client/server environments with Remote Direct Memory (RDM) endpoints, a server may need to securely communicate with multiple clients and also isolate Remote Direct Memory Access (RDMA) traffic between independent clients. Furthermore, a server may need to map an incoming RDMA operation to a specific authorization key and respond to a client using the client-specific authorization key. One solution is for a single server to use a unique endpoint (with its own authorization key) to communicate with each client endpoint. However, this solution is not scalable when the server needs to support a large number of authorization keys for multiple clients (e.g., 10K's).

BRIEF DESCRIPTION OF THE FIGURES

In the figures, like reference numerals refer to the same figure elements.

DETAILED DESCRIPTION

Figure 1:
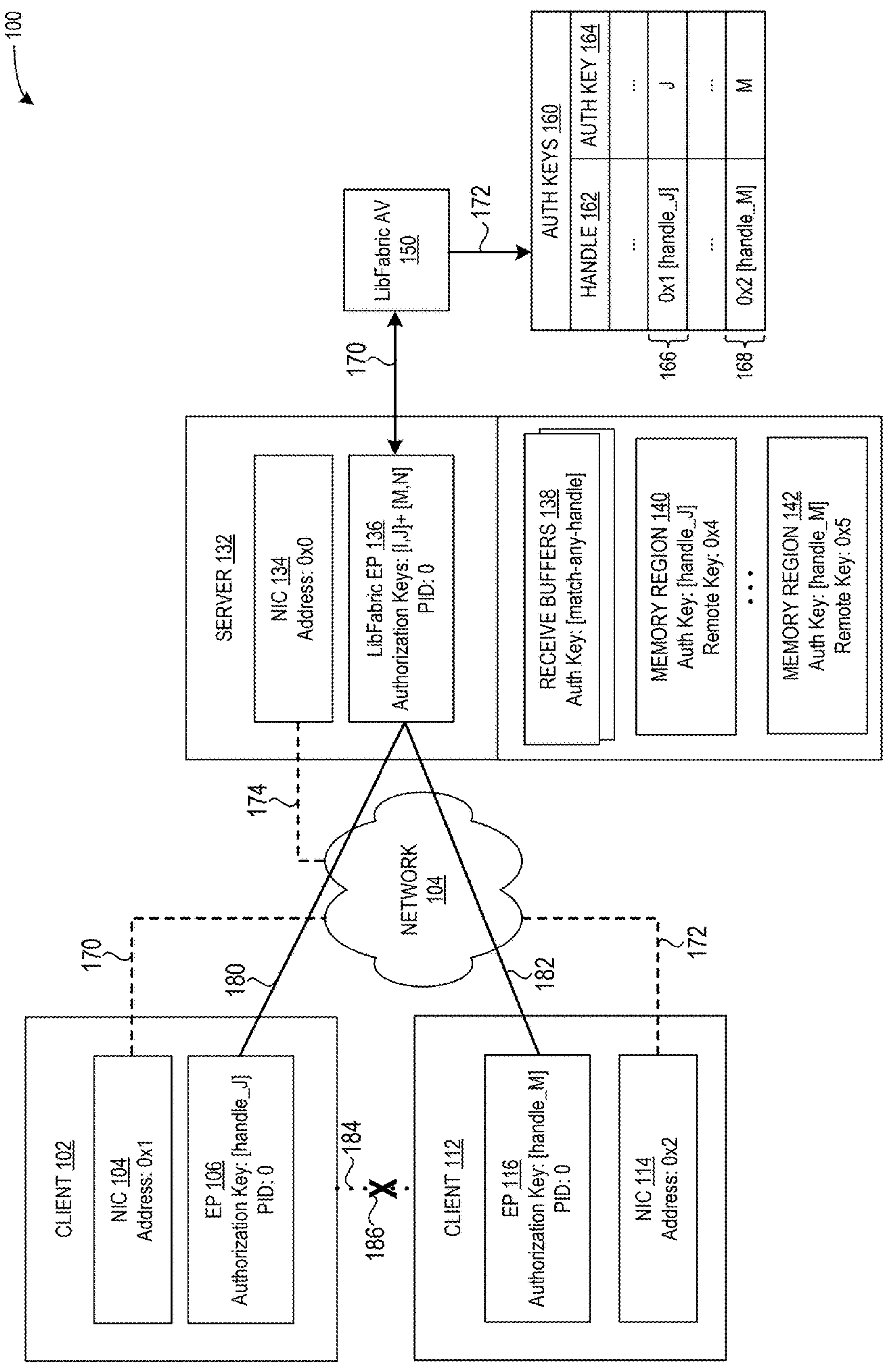
FIG. 1 illustrates an environment which facilitates enabling RDMA endpoint resource isolation in a connectionless environment, in accordance with an aspect of the present application.

Aspects of the instant application address scalability limitations of communications between endpoints in a connectionless network environment by allowing a single endpoint to support multiple authorization keys. An incoming RDMA operation (request) can include the client-specific authorization key, and the outgoing RDMA operation (response) can dynamically select the client-specific authorization key. Furthermore, the endpoint may restrict access to network resources (such as memory regions) by other specific endpoints in the connectionless network environment based on authorization keys and, in some instances, remote access keys. The described aspects may be implemented by extending an existing network API (e.g., LibFabric) and modifying underlying hardware (e.g., data structures in network interface cards (NICs)).

A connectionless network environment may include multiple endpoints which can communicate with each other based on authorization keys, e.g., a client/server environment with RDM endpoints. In some aspects, a single server endpoint (EP) may need to support, communicate, or provide access to multiple client endpoints (EPs). Only peer endpoints programmed with the same authorization key may communicate with each other. Using unique authorization keys per endpoint can prevent client EPs from erroneously or maliciously issuing RDMA operations to each other.

In client/server environments with RDM endpoints (e.g., client EPs and server EPs), a server EP may need to securely communicate with multiple clients and also isolate Remote Direct Memory Access (RDMA) traffic between independent clients. Furthermore, a server may need to map an incoming RDMA operation to a specific authorization key and respond to a client using the client-specific authorization key. One solution is for a single server to use a unique endpoint (with its own authorization key) to communicate with each client endpoint. However, this solution is not scalable when the server needs to support a large number of authorization keys for multiple clients (e.g., 10K's).

The described aspects address these limitations by, instead of using an endpoint per client, allowing a single endpoint to use (i.e., be bound and enabled against) multiple authorization keys. An authorization key may be associated with the memory region itself (as described below in relation to FIG. 1). The described aspects can use a container or list of authorization keys, referred to as an "authorization key ring." The authorization key ring can define the authorization keys against which the endpoint is enabled and be used to validate whether a first authorization key of a client EP communicating with a server EP matches an enabled authorization key in the authorization key ring. Thus, in a connectionless client/server network environment with at least one server EP and multiple client EPs, a server EP may configure an authorization key ring by enabling a plurality of authorization keys. A respective EP (of the multiple client EPs) can be associated with a respective authorization key.

This one-to-many mapping can allow the single server EP to communicate with the plurality of client server EPs.

Enabling multiple authorization keys per endpoint may be implemented, e.g., by extending an existing network API, such as LibFabric, and by modifying underlying hardware, such as data structures in NICs. In addition, while managing communications from multiple client EPs including incoming RDMA operations, where each client EP can use a respective authorization key enabled in the authorization key ring of the server EP, the network API associated with the server EP may report the specific authorization key used for an incoming RDMA operation. As a result, the server EP may select which authorization key to use when performing an outgoing RDMA operation, as described below in relation to FIGS. 2 and 5A. Furthermore, the server EP may restrict access by client EPs to network resources (e.g., receive buffer, memory regions, etc.) based on the authorization key ring and, in some aspects, a remote access key configured for a specific memory region, as described below in relation to FIGS. 3B and 4.

The term "endpoint" ("EP") refers to a computing entity which can transmit or receive data. An endpoint in this disclosure may include one of a plurality of endpoints in a client/server connectionless network environment, such as a server EP and a client EP. Furthermore, in this disclosure, a server EP is used as an example of a single EP which communicates with multiple client EPs. However, the operations and communications described herein are not limited to a server EP and may be used by any endpoint in a connectionless network environment when communicating with a plurality of other endpoints.

An "authorization key" may be used to validate that one endpoint may securely communicate with another endpoint. An authorization key may be referred to in some instances as a "label." An authorization key may be associated with a corresponding "handle." That is, a handle may identify an authorization key for an incoming RDMA operation. The handle may be returned in a target completion event, as described below in relation to FIG. 1. The handle, along with a source address also returned in the target completion event, may enable a server EP to respond, in an outgoing RDMA operation, to the correct and specific client associated with the incoming RDMA operation. That is, the handle may be used to select the authorization key for an outgoing RDMA operation. A server EP may change the authorization key on a per-RDMA operation basis.

An "authorization key ring" refers to a container, list, table, or group of authorization keys. In this disclosure, software of a server EP may configure the authorization key ring with multiple authorization keys and subsequently program hardware of the server EP (e.g., TCAM and CAMs) with the configured information, which can allow the hardware to validate authorization keys included in subsequent incoming RDMA operations.

FIG. 1 illustrates an environment 100 which facilitates enabling RDMA endpoint resource isolation in a connectionless environment, in accordance with an aspect of the present application. Environment 100 may include a plurality of clients (102 and 112) communicating with a single server (132). Each client may include a network interface card (NIC) and be associated with an endpoint (EP). For example, client 102 may include a NIC 104 with an address of "0x1" and a client EP 106 associated with an authorization key of "[handle_J]" and a process identifier (PID) of "0." Similarly, client 112 may include a NIC 114 with an address of "0x2" and a client EP 116 associated with an authorization key of "[handle_M]" and a PID of "0." Server 132 may include a NIC 134 with an address of "0x0" and a server EP 136 associated with a plurality of authorization keys (i.e., an authorization key ring), including "[I, J]" and "[M, N]." EP 136 may also be associated with a PID of "0." EP 136 may be, e.g., a LibFabric endpoint.

Server 132 may also include a plurality of receive buffers 138, where any one or more of receive buffers 138 may be associated with one or more authorization keys or any authorization key, e.g., as indicated by the "[match-any-handle]" or wildcard value for the associated authorization key for server 132. Server 132 may further include memory regions, which may each be designated or assigned to a specific authorization key and a remote access key or a plurality of specific authorization keys and remote access keys. For example, a memory region 140 may be associated with an authorization key of "[handle_J]" and a remote key of "0x4" while a memory region 142 may be associated with an authorization key of "[handle_M]" and a remote key of "0x5." A memory region may also be configured to "match any handle," e.g., be assigned to any authorization key or remote access key.

Server EP 136 can communicate using a software application programming interface (API) (via a communication 170). For example, LibFabric EP 136 may utilize a LibFabric Address Vector (AV) 150, which can be used to construct an authorization key ring (via a communication 172), e.g., authorization keys 160 which are enabled or configured on server EP 136. Authorization key ring 160 may include a mapping of authentication keys 164 to corresponding handles 162 for the authentication keys. In authorization key ring 160, an entry 166 may indicate that the authorization key "J" is mapped to a handle of "0x1" (or "[handle_J]"), while an entry 168 may indicate that the authorization key "M" is mapped to a handle of "0x2" (or "[handle_M]").

During operation, the single server EP 136 can communicate with multiple client EPs (e.g., 106 and 116) based on multiple authorization keys being enabled for the single server EP 136, where each authorization key corresponds to a single client EP. For example, because server EP 136 has enabled multiple authorization keys in authorization key ring 160 (including J and M), client EP 106 may communicate with server EP 136 (via a communication 180, which can occur between the respective NICs 104 and 134 of each entity as indicated by communications 170 and 174) using the handle ("[handle_J]") which corresponds to authorization key "J." Similarly, client EP 116 may communicate with server EP 136 (via a communication 182, which can occur between the respective NICs 114 and 134 of each entity as indicated by communications 172 and 174) using the handle ("[handle_M]") which corresponds to authorization key "M."

By enabling a plurality of authorization keys for the server EP 136 (and assuming that the network can enforce the association of authorization keys to the client), the described aspects can eliminate or prevent unwanted direct communication between clients 102 and 112, e.g., clients 102 and 112 cannot issue RDMA operations to each other, as indicated by a label "X" 186 on a potential communication 184 between clients 102 and 112. Furthermore, the described aspects may restrict resources of and associated with the server (e.g., receive buffers 138 and memory regions 140 and 142) to specific clients based on authorization keys and remote access keys, as described below in relation to FIGS. 3B and 4.

Figure 2:
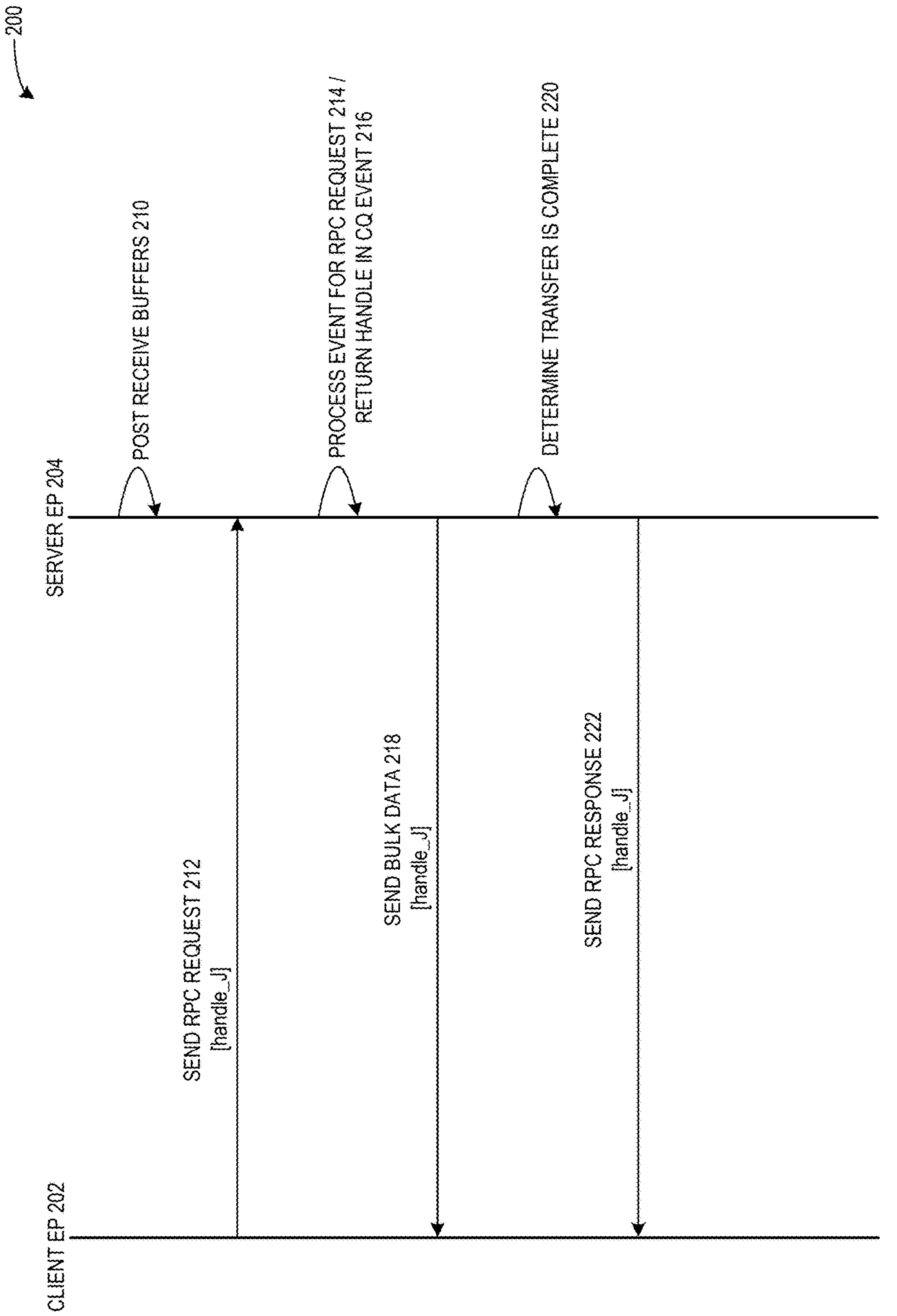
FIG. 2 illustrates a diagram of communications which facilitate enabling RDMA endpoint resource isolation in a connectionless environment, including supporting multiple authorization keys in a single endpoint, in accordance with an aspect of the present application.

FIG. 2 illustrates a diagram 200 of communications which facilitate enabling RDMA endpoint resource isolation in a connectionless environment, including supporting multiple authorization keys in a single endpoint, in accordance with an aspect of the present application. Diagram 200 can include communications between a server EP 204 ("first endpoint") and a client EP 202 ("second endpoint"). Server EP 204 may correspond to server EP 136 of FIG. 1 and client EP 202 may correspond, e.g., to client EP 106 of 116 of FIG. 1.

Prior to the communications depicted in diagram 200, in a connectionless network environment which includes server EP 204 and multiple client EPs (such as client EP 202), server EP 204 may enable a plurality of authorization keys, where a respective EP (of the multiple client EPs) can be associated with a respective authorization key. This one-to-many mapping may allow the single server EP to communicate with the plurality of client server EPs.

Server EP 204 may post receive buffers (operation 210). This may include synchronizing incoming RDMA operations or remote procedure calls (RPCs) received from all clients (including client EP 202) and inserting them into a receive buffer. The buffer may be a normal buffer or a tagged buffer, i.e., a buffer which is specifically assigned to a tag or other label which is indicated in a corresponding incoming request. Similar to server EP 136 of FIG. 1, server EP 204 may be associated with a plurality of receive buffers, which may each be set to allow access based a single authorization key, multiple authorization keys, or any authorization key (e.g., a "[match-any-handle]" or wildcard), as described below in relation to FIG. 3B.

Client EP 202 may send an RPC request 212 as part of incoming RDMA request (to server EP 204). RPC request 212 may include an action, an RPC, and a first authorization key associated with client EP 202 (e.g., "[handle_J]"). Server EP 204 may process the event for RPC request 212 (operation 214), e.g., by performing the action indicated in the RPC request. Server EP 204 may return the corresponding handle for the event in a completion queue event ("CQ Event") (operation 216). As part of the outgoing RDMA operation, server EP 204 may obtain the first authorization key by selecting the corresponding handle associated with RPC request 212. Using this selected handle (e.g., "[handle_J]"), server EP 204 may subsequently transmit data associated with the RPC request (i.e., response data) back to client EP 202 (operation 218). That is, the data may be transmitted to the RPC request-sending client EP (e.g., client EP 202) based on the corresponding handle ("[handle_J]"). Server EP 204 may determine that the transfer is complete (operation 220), e.g., by receiving a last packet corresponding to completion of the transfer, and may send an RPC response message, again based on the corresponding handle ("[handle_J]") (operation 222), where the response message may indicate that the requested data has been transmitted. In some aspects, the data transmitted in operation 218 may include a notification that the requested data has been transmitted, essentially combining operations 218 and 222 into a single message or the same data flow.

Figure 3A:
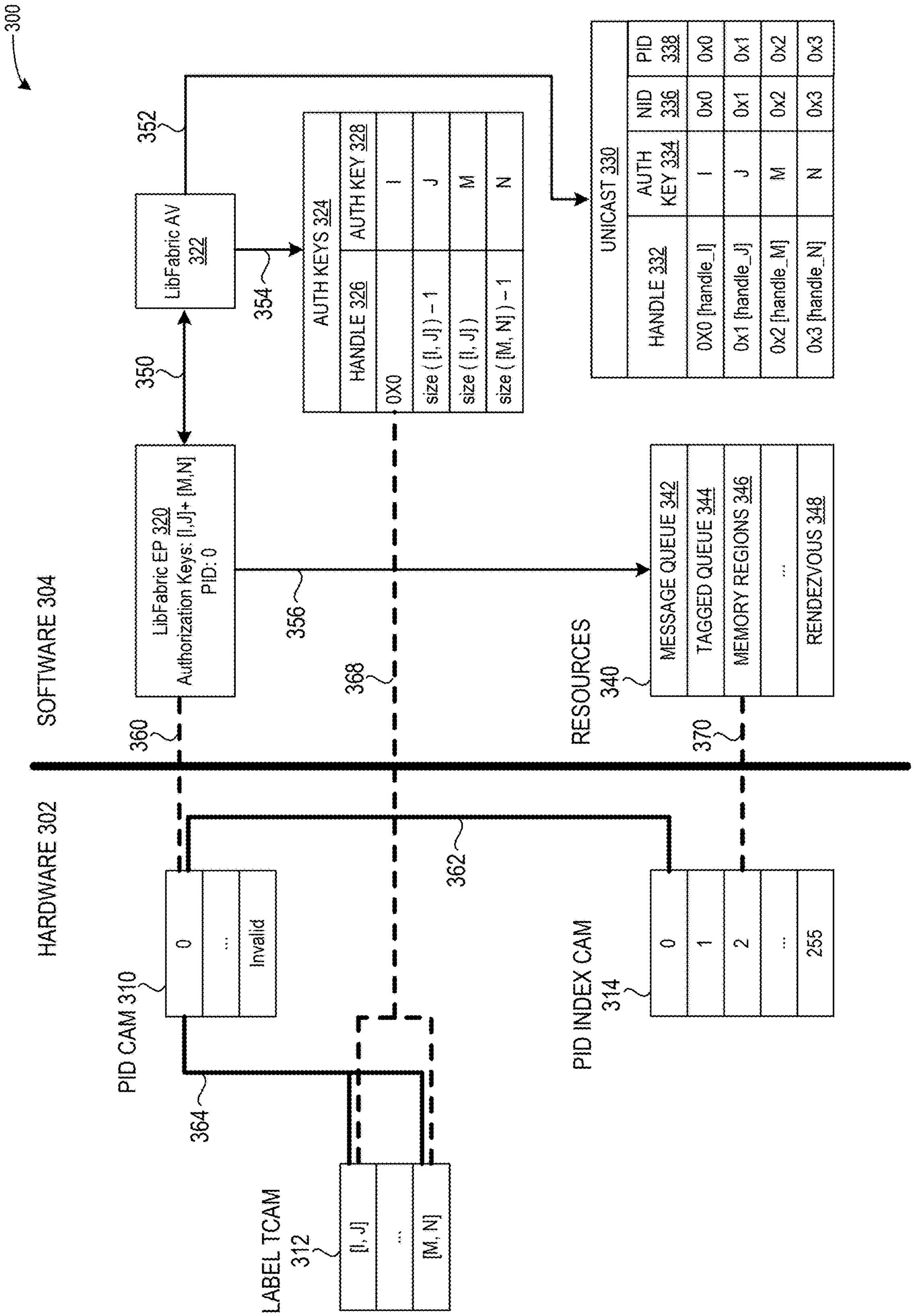
FIG. 3A illustrates an environment which facilitates enabling RDMA endpoint resource isolation in a connectionless environment, including configuring software and programming hardware, in accordance with an aspect of the present application.

FIG. 3A illustrates an environment 300 which facilitates enabling RDMA endpoint resource isolation in a connectionless environment, including configuring software and programming hardware, in accordance with an aspect of the present application. Environment 300 illustrates modules, components, units, memory, and data structures which reside in hardware 302 (e.g., in a network interface card (NIC)) and in software 304 (e.g., based on a software API such as LibFabric). A user or the system may configure certain information using software 304, which information may be used to program hardware 302. Hardware 302 may subsequently enforce access (e.g., the authorization keys) for incoming RDMA requests and support outgoing RDMA requests.

In software 304, a LibFabric EP 320 may be associated with multiple authorization keys, i.e., multiple authorization keys have been enabled on EP 320 ("[I, J]+[M, N]"), and EP 320 may be associated with a PID of "0." LibFabric EP 320 may be a server EP and may invoke (via a communication 350) a software component LibFabric Address Vector (AV) 322 to store the enabled multiple authorization keys. LibFabric AV 322 may facilitate maintaining (via a communication 354) a data structure of authorization keys 324, e.g., an authorization key ring 324. Authorization key ring 324 may store entries which map an authorization key 328 to a corresponding handle 326. For example: a handle of "0x0" (or "[handle_I]") may correspond to the authorization key "I"; a handle of "size ([I, J])−1" (or "[handle_J]") may correspond to the authorization key "J"; a handle of "size ([I, J])" (or "[handle_M") may correspond to the authorization key "M"; and a handle of "size ([M, N])−1" (or "[handle_N]") may correspond to the authorization key "N."

LibFabric AV 322 may also facilitate maintaining (via a communication 352) a data structure or table 330 for handling unicast communication. Table 330 may include entries with at least the following fields: a handle 332; a corresponding authorization key 334; a network identifier (NID) 336; and a process identifier (PID) 338. For example: a handle of "0x0" (also referred to as "[handle_I]") may correspond to an authorization key of "I," a NID of "0x0," and a PID of "0x0"; a handle of "0x1" (also referred to as "[handle_J]") may correspond to an authorization key of "J," a NID of "0x1," and a PID of "0x1"; a handle of "0x2" (also referred to as "[handle_M]") may correspond to an authorization key of "M," a NID of "0x2," and a PID of "0x2"; and a handle of "0x3" (also referred to as "[handle_N]") may correspond to an authorization key of "N," a NID of "0x3," and a PID of "0x3."

In addition to enabling the authorization key ring 324, EP 320 may configure resources 340, including but not limited to, e.g., a message queue 324, a tagged queue 344, memory regions 346, and a rendezvous resource 348. After software 304 has created the mappings depicted in FIG. 3A, EP 320 may program (indicated by an operation 360) a PID CAM 310 with the PID ("0") of EP 320 and the enabled and corresponding multiple authorization keys in Label TCAM 312 (indicated by an operation 368 and a correspondence 364 from PID CAM 310). Each entry in PID CAM 310 may correspond to a PID Index CAM 314 (indicated as a correspondence 362). Entries in PID Index CAM 314 may be programmed to correspond to entries in resources 340 (indicated as an operation 370). That is, an entry for PID Index CAM "0" may correspond to message queue 342, an entry for PID Index CAM "1" may correspond to tagged queue 344, and an entry for PID Index CAM "2" may correspond to memory regions 346.

Figure 3B:
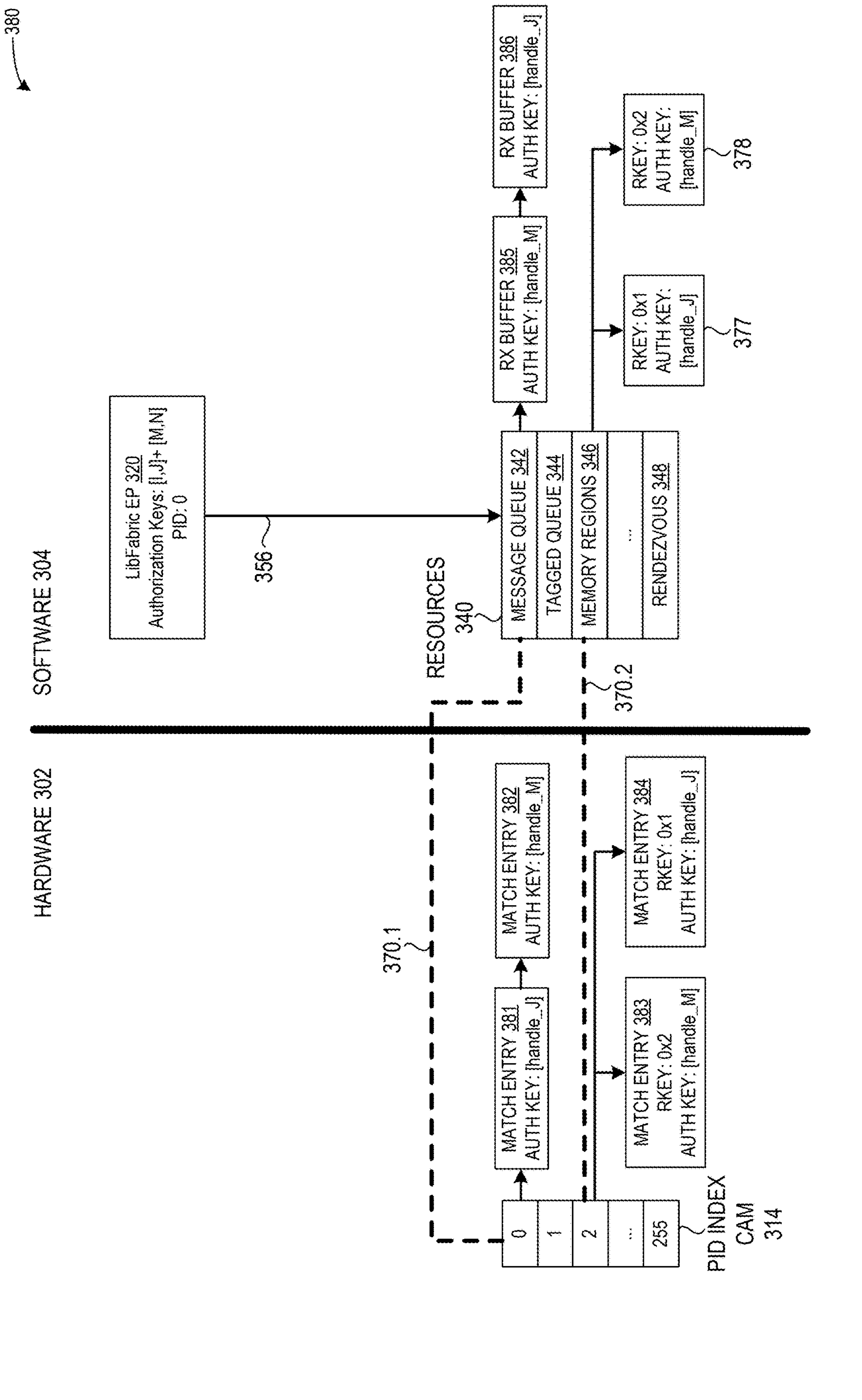
FIG. 3B illustrates an environment which facilitates enabling RDMA endpoint resource isolation in a connectionless environment, including restricting access to specific resources, in accordance with an aspect of the present application.

FIG. 3B illustrates an environment 380 which facilitates enabling RDMA endpoint resource isolation in a connectionless environment, including restricting access to specific resources, in accordance with an aspect of the present application. Environment 380 corresponds to environment 300 of FIG. 3A and omits certain data structures and entities described in FIG. 3A in order to depict the restriction of access to server resources. In environment 380, EP 320 has configured its resources 340 in a particular manner. For example, message queue 342 may include a receive (RX) buffer 385 which is restricted to the authorization key corresponding to "[handle_M]" and a receive (RX) buffer 386 which is restricted to the authorization key corresponding to "[handle_J]". A receive buffer may be restricted to or associated with a single authorization key (as depicted above for RX buffers 385 and 386), multiple authorization keys, or any authorization key based on a wild card handle (as depicted above for receive buffer 138 of FIG. 1 with a "[match-any-handle]"). Furthermore, while not depicted, tagged queue 344 (and any resource of resources 340) may include resources such as buffers or memory regions which are also restricted to or associated with one, some, or all/any authorization keys.

In environment 380, EP 320 has also configured its memory regions 346 in a particular manner. A memory region 387 may be limited to access only by an endpoint with an authorization key corresponding to "[handle_J]" and using a remote key of "0x1" and memory region 388 may be limited to access only by an endpoint with an authorization key corresponding to "[handle_M]" and using a remote key of "0x2." After EP 320 has configured its resources 340 in software 304, software 304 may program hardware 302 with the corresponding information. For example, in PID Index CAM 314, the entry at index "0" may be programmed to correspond to message queue 342 of resources 340 (as indicated by an operation 370.1). The entry at index "0" may include entries which indicate that a respective receive buffer may be accessed by an authorization key corresponding to "[handle_J]" (as in a match entry 381) and "[handle_M]" (as in a match entry 382). Subsequently, when receiving an RPC or RDMA request, hardware 302 may validate access to the receive buffer(s) by performing a lookup in PID Index CAM 314 (which may be accessed and associated with PID CAM 310 and Label TCAM 312), as described below in relation to FIGS. 5A-C.

Furthermore, in PID Index CAM 314, the entry at index "2" may be programmed to correspond to memory regions 346 of resources 340 (as indicated by an operation 370.2). The entry at index "2" may include an entry which indicates that the memory region 388 may only be accessed by an authorization key corresponding to "[handle_J]" and using a remote key of "0x2" (as in a match entry 383). The entry at index "2" may also include an entry which indicates that the memory regions may be accessed only by an authorization key corresponding to "[handle_M]" and using a remote key of "0x1" (as in a match entry 384). Subsequently, when receiving an RPC or RDMA request, hardware 302 may validate access to a respective memory region by performing a lookup in PID Index CAM 314 (which may be accessed and associated with PID CAM 310 and Label TCAM 312), as described below in relation to FIGS. 5A-C. In some aspects, server EP 320 may return to a client EP a remote access key ("RKEY") corresponding to the authorization key provided by the client EP, and the client EP may subsequently use the provided remote access key in an RDMA operation to access the associated memory region, as described below in relation to FIGS. 4 and 5C. In FIGS. 3A and 3B, while resources 340 is depicted as part of software 304, resources 340 can indicate resources accessed by software 304 but residing in hardware 302.

Figure 4:
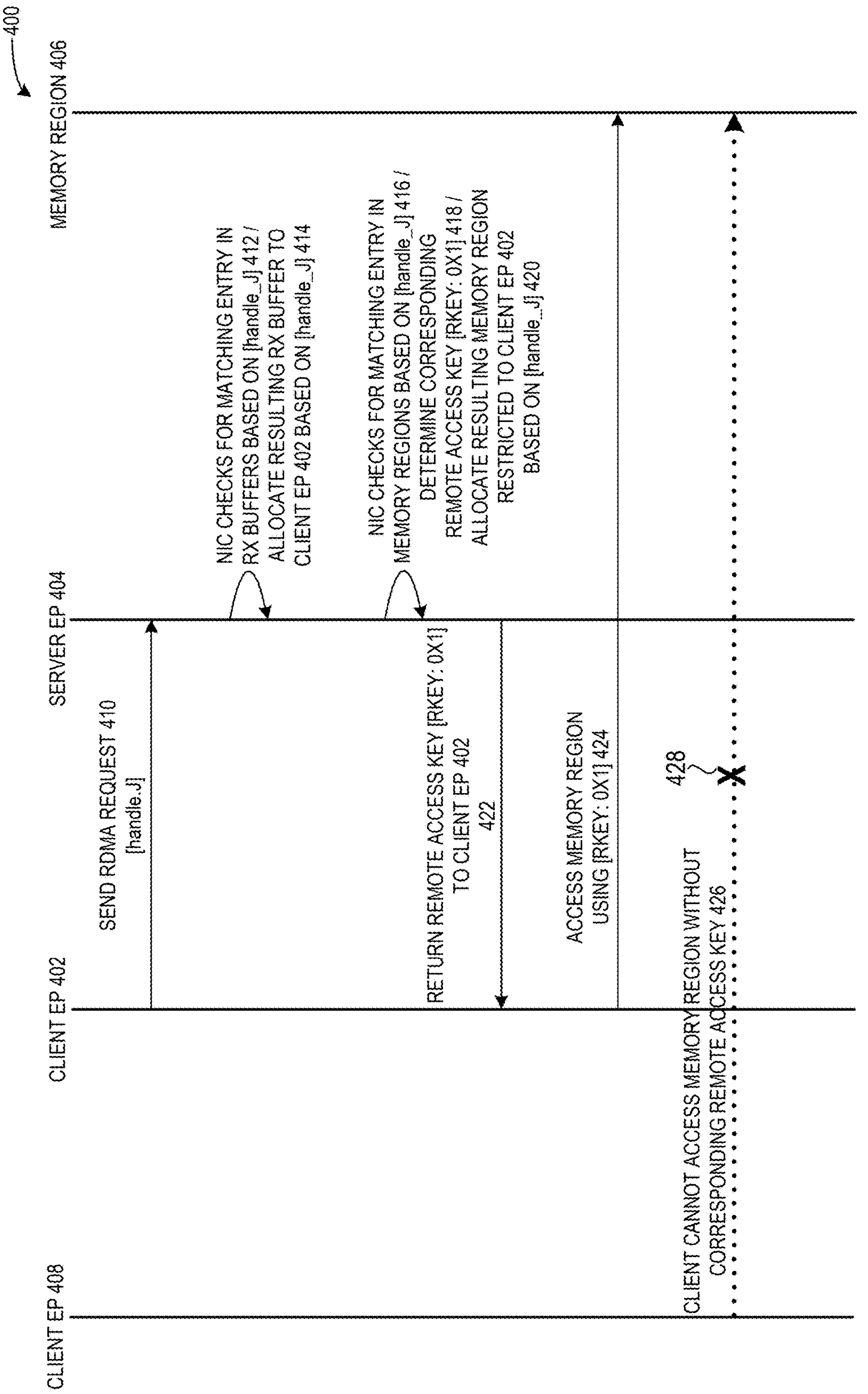
FIG. 4 illustrates a diagram of communications which facilitate enabling RDMA endpoint resource isolation in a connectionless environment, including isolating memory regions, in accordance with an aspect of the present application.

FIG. 4 illustrates a diagram 400 of communications which facilitate enabling RDMA endpoint resource isolation in a connectionless environment, including isolating memory regions, in accordance with an aspect of the present application. The connectionless environment depicted in diagram 400 may include communications between a client EP 408, a client EP 402 ("second endpoint," similar to client EP 202 of FIG. 2), a server EP 404 ("first endpoint," similar to server EP 204 of FIG. 2), and a memory region 406 (similar to memory regions 346 of FIGS. 3A and 3B). Similar to the communications in FIG. 2, prior to the communications depicted in diagram 400, in a connectionless network environment which includes server EP 404 and multiple client EPs (such as client EPs 402 and 408), server EP 404 may enable a plurality of authorization keys, where a respective EP (of the multiple client EPs) can be associated with a respective authorization key, which allows server EP 404 to communicate with the plurality of client server EPs.

Client EP 402 may send an RDMA request 410 (to server EP 404). RDMA request 410 may include an RDMA action (such as a read or write) and a first authorization key associated with the client (e.g., "[handle_J]"). Server EP 404 may receive RDMA request 410 and a NIC of server EP 404 may validate the first authorization key by matching the first authorization key to one of the enabled authorization keys (operation 412), e.g., by searching or checking for a matching entry for the corresponding PID at PID Index CAM 314, such as index "0" which includes match entries for the receive buffer. Upon finding a matching entry (e.g., match entry 381 for authorization key corresponding to "[handle_J]"), server EP 404 may allocate the resulting receive buffer to client EP 402 based on the "[handle_J]" (operation 414).

The NIC of server EP 404 may also validate access to the memory regions by the second endpoint (i.e., client EP 402) (operation 416), e.g., by searching or checking for a matching entry for the corresponding PID at PID Index CAM 314, such as index "2" which includes match entries for the memory regions. Upon finding a matching entry (e.g., match entry 384 for authorization key corresponding to "[handle_J]"), server EP 404 may determine the corresponding remote access key from the match entry (e.g., "RKEY: 0x1") and may allocate the resulting memory region 387, which is restricted to client EP 402 based on the "[handle_J]" (operation 420).

Server EP 404 may return the remote access key ("RKEY: 0x1") to client EP 402 (operation 422), and client EP 402 may use the returned remote access key to subsequently perform RDMA operations on the corresponding allocated memory region (operation 424). That is, client EP 402 may access memory region 387 using "RKEY: 0x1" and its authorization key of "[handle_J]" because subsequent RDMA requests which include the authorization key and the remote access key can be permitted, after a validation check by hardware 302, to access the memory region. The memory region may be part of a same device as server EP 404 or may be in or part of a separate storage device or storage medium, e.g., a LibFabric memory region.

Furthermore, subsequent attempts by other clients to access the memory region may result in failure or be rejected, as indicated by the dotted line for an attempted operation 426 by client EP 408, which dotted line is crossed out with a label "X" 428. Since memory region 387 (depicted as memory region 406 in FIG. 4) is restricted to access only by client EP 402 with authorization key "[handle_J]" and the remote access key "RKEY: 0x1," the validation by hardware 302 will fail because no match entry exists to that memory region for client EP 404 using authorization key "[handle_M]" and remote access key "RKEY: 0x2." Note that the remote key may be returned to a client and the authorization key may be separately enforced by a layer of the network at or near the injection point. Thus, the remote key may be visible and usable by any entity to which the key is provided, and the authorization key may be enforced as part of the identity of the client.

Thus, the described aspects can restrict access to resources (e.g., memory regions) to one specific client EP or a group of client EPs (as described above in relation to the communications of FIG. 4) and can also allow access to resources (e.g., receive buffers) to any or all client EPs (as described above in relation to the "[match-any-handle]" for receive buffers 138 of FIG. 1).

In outgoing RDMA operations, an authorization key may be referred to as a "label," and a hardware construct which defines an outgoing label for an RDMA operation may be referred to as a NIC "communication profile" (CP). The software of an EP may store a pointer to a handle which identifies the communication profile, while the communication profile structure itself may reside in a data structure in the hardware of the EP. When performing an outgoing RDMA operation, a command may be queued via a transaction command queue (TXQ) to the hardware, e.g., a command to issue an RDMA operation using a specified CP handle. Each TXQ may be associated with a NIC CP and each CP may define the traffic class and label for the RDMA operations. The hardware may query its data structures and determine that the CP handle is associated with a particular label (i.e., authorization key). A TXQ may be limited to supporting only a certain number of communication profiles, e.g., 16. However, the system may need to support on the order of thousands of different labels (i.e., authorization keys).

The described aspects can address this limitation in outgoing RDMA operations by performing several checks related to identifying, changing, and allocated new communication profiles. During operation, an outgoing RDMA operation may be issued. The system may determine whether a matching CP is available in the cache (e.g., a cached CP+TXQ pair). If the matching CP is available in the cache, the system may queue the outgoing RDMA operation. If the matching CP is not available in the cache, the software in the system may modify the attributes of an existing CP (e.g., by querying a driver to change the label value of an existing CP.

Hardware may process a command to modify the attribute (e.g., change the label) and validate against the associated CP to determine whether the label is within an acceptable range. Hardware may use a "match under mask," in which validation of certain bits may be selectively disabled, which may allow one context or CP to be associated with many labels. If this modification is successful (i.e., the label is within the acceptable range), the system may queue the outgoing RDMA operation. If this modification is not successful (i.e., the label is not within the acceptable range), hardware may reject the TXQ label change and the system may allocate a new CP (e.g., a new CP+TXQ pair). If the allocation is successful, the system may queue the outgoing RDMA operation. If the allocation is not successful, the system may try again at a later time. By using this TXQ label change mechanism to select an appropriate label for an outgoing RDMA operation, the described aspects may more efficiently allow software to pipeline RDMA operations to many different clients.

Figure 5A:
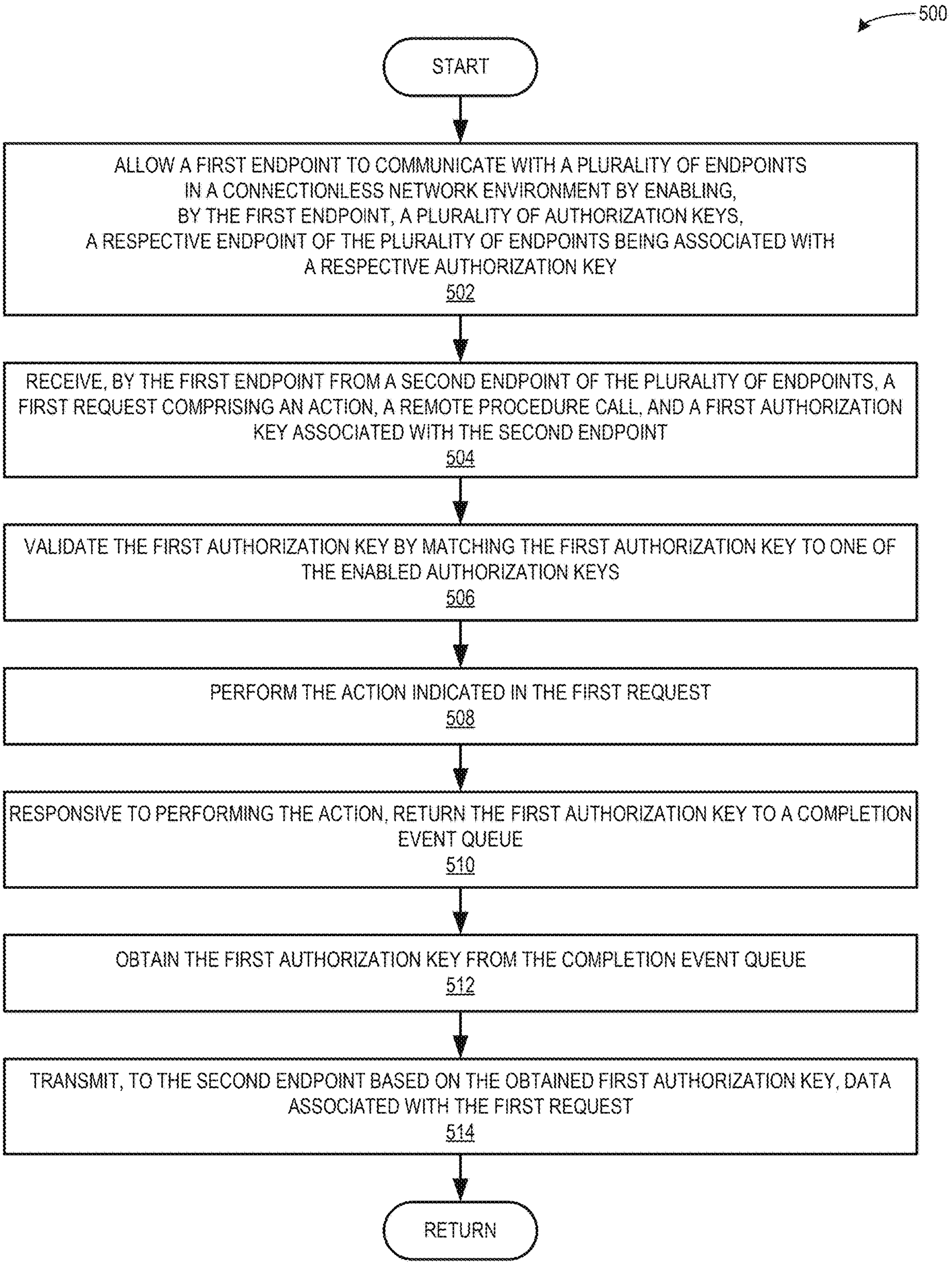
FIG. 5A presents a flowchart illustrating a method which facilitates enabling RDMA endpoint resource isolation in a connectionless environment, in accordance with an aspect of the present application.

FIG. 5A presents a flowchart 500 illustrating a method which facilitates enabling RDMA endpoint resource isolation in a connectionless environment, in accordance with an aspect of the present application. During operation, the system allows a first endpoint to communicate with a plurality of endpoints in a connectionless network environment by enabling, by the first endpoint, a plurality of authorization keys, a respective endpoint of the plurality of endpoints being associated with a respective authorization key (operation 502). An example of enabling the plurality of authorization keys is described above in relation to the configuration of authorization key rings 160 and 324 of, respectively, FIGS. 1 and 3A, in which server EPs 136 and 320 ("first endpoint") of, respectively, FIGS. 1 and 3A, map the authorization keys to corresponding handles.

The system receives, by the first endpoint from a second endpoint of the plurality of endpoints, a first request comprising an action, a remote procedure call, and a first authorization key associated with the second endpoint (operation 504), as described above in relation to communication 212 from client EP 202 to server EP 204 of FIG. 2. The first authorization key included in the first request can comprise a handle for the authorization key. The system validates the first authorization key by matching the first authorization key to one of the enabled authorization keys (operation 506). For example, in FIG. 3A, the system may perform a lookup in label TCAM 312, where TCAM 312 can be programmed by software 304 with the authorization keys in authorization key ring 324. Programing hardware 302 may allow hardware 302 to perform the validation and enforce the access constraints configured by software 304.

The system performs the action indicated in the first request (operation 508), as described above in relation to operation 214 by server EP 204 of FIG. 2. Responsive to performing the action, the system returns the first authorization key to a completion event queue (operation 510), as described above in relation to operation 216 of FIG. 2. The system obtains the first authorization key from the completion event queue (operation 512), as described above in relation to modifying or selecting the appropriate authorization key in outgoing RDMA operations. The system transmits, to the second endpoint based on the obtained first authorization key, data associated with the first request (operation 514), as described above in relation to operation 218 (or combined operations 218 and 222) by server EP 204 in FIG. 2.

Figure 5B:
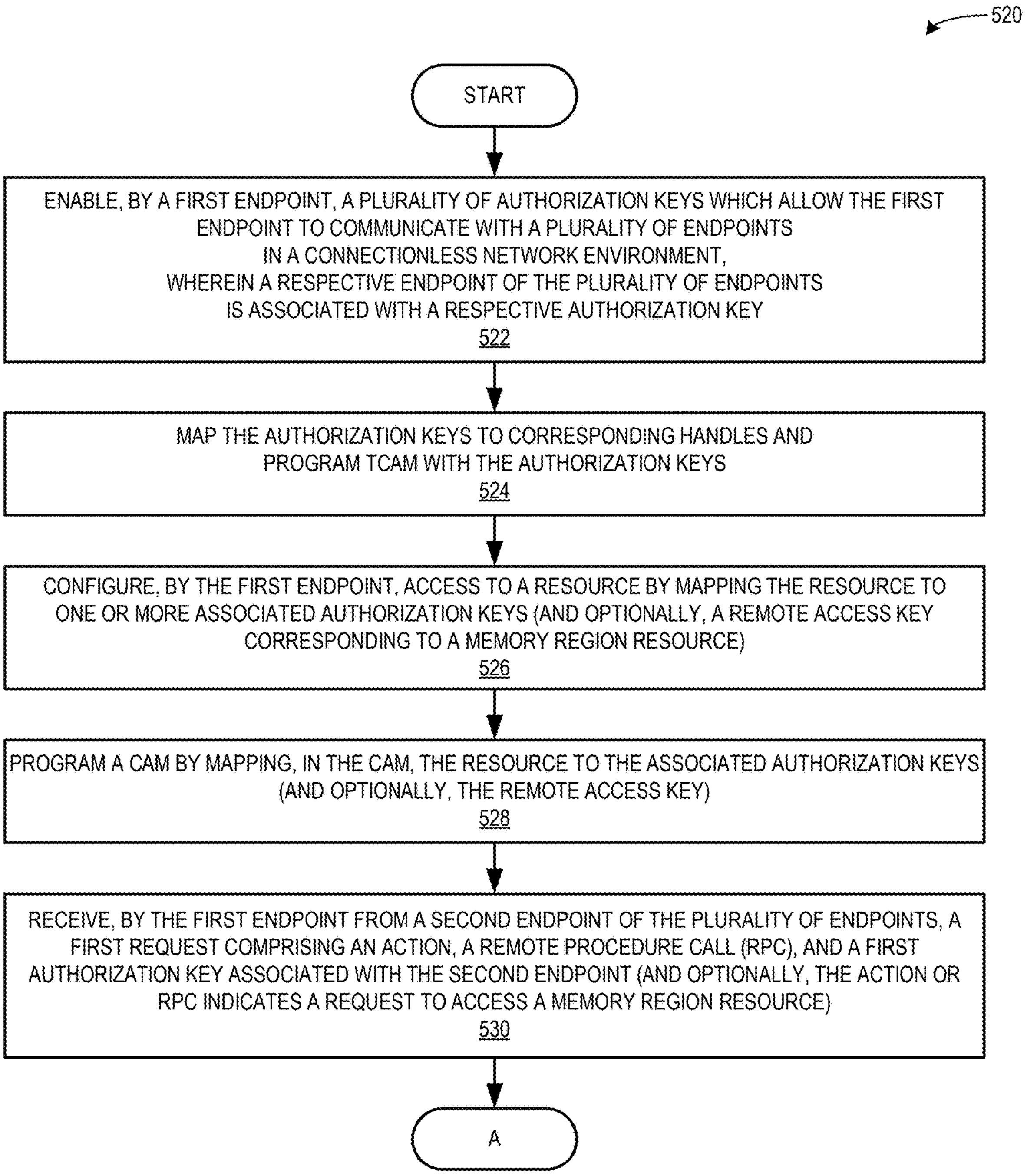
FIG. 5B presents a flowchart illustrating a method which facilitates enabling RDMA endpoint resource isolation in a connectionless environment, including restricting access to specific resources, in accordance with an aspect of the present application.

FIG. 5B presents a flowchart 520 illustrating a method which facilitates enabling RDMA endpoint resource isolation in a connectionless environment, including restricting access to specific resources, in accordance with an aspect of the present application. During operation, the system enables, by a first endpoint, a plurality of authorization keys which allow the first endpoint to communicate with a plurality of endpoints in a connectionless network environment, wherein a respective endpoint of the plurality of endpoints is associated with a respective authorization key (operation 522, similar to operation 502 of FIG. 5A). An example of enabling the plurality of authorization keys is described above in relation to the configuration of authorization key rings 160 and 324 of, respectively, FIGS. 1 and 3A. The system maps the authorization keys to corresponding handles and programs a TCAM with the authorization keys (operation 524). Software in an endpoint may program hardware in the endpoint with the configured information, e.g., various data structures including TCAM 312 and CAMs 310 and 314 as described above in relation to FIG. 3A. The system configures, by the first endpoint, access to a resource by mapping the resource to one or more associated authorization keys (and optionally, to a remote access key corresponding to a memory region resource) (operation 526), as described above in relation to receive buffers 385 and 386 of message queue 342 as well as memory regions 387 and 388 of memory regions 346 of FIG. 3B. The system programs a content-addressable memory (CAM) by mapping, in the CAM, the resource to the associated authorization keys (operation 528), as described above in relation to 370.1 and 370.2 of FIG. 3B.

The system receives, by the first endpoint from a second endpoint of the plurality of endpoints, a first request comprising an action, a remote procedure call, and a first authorization key associated with the second endpoint (operation 530, similar to operation 504 of FIG. 5A), as described above in relation to communication 212 from client EP 202 to server EP 204 of FIG. 2. The first authorization key included in the first request may comprise a handle for the authorization key. The operation continues at Label A of FIG. 5C.

Figure 5C:
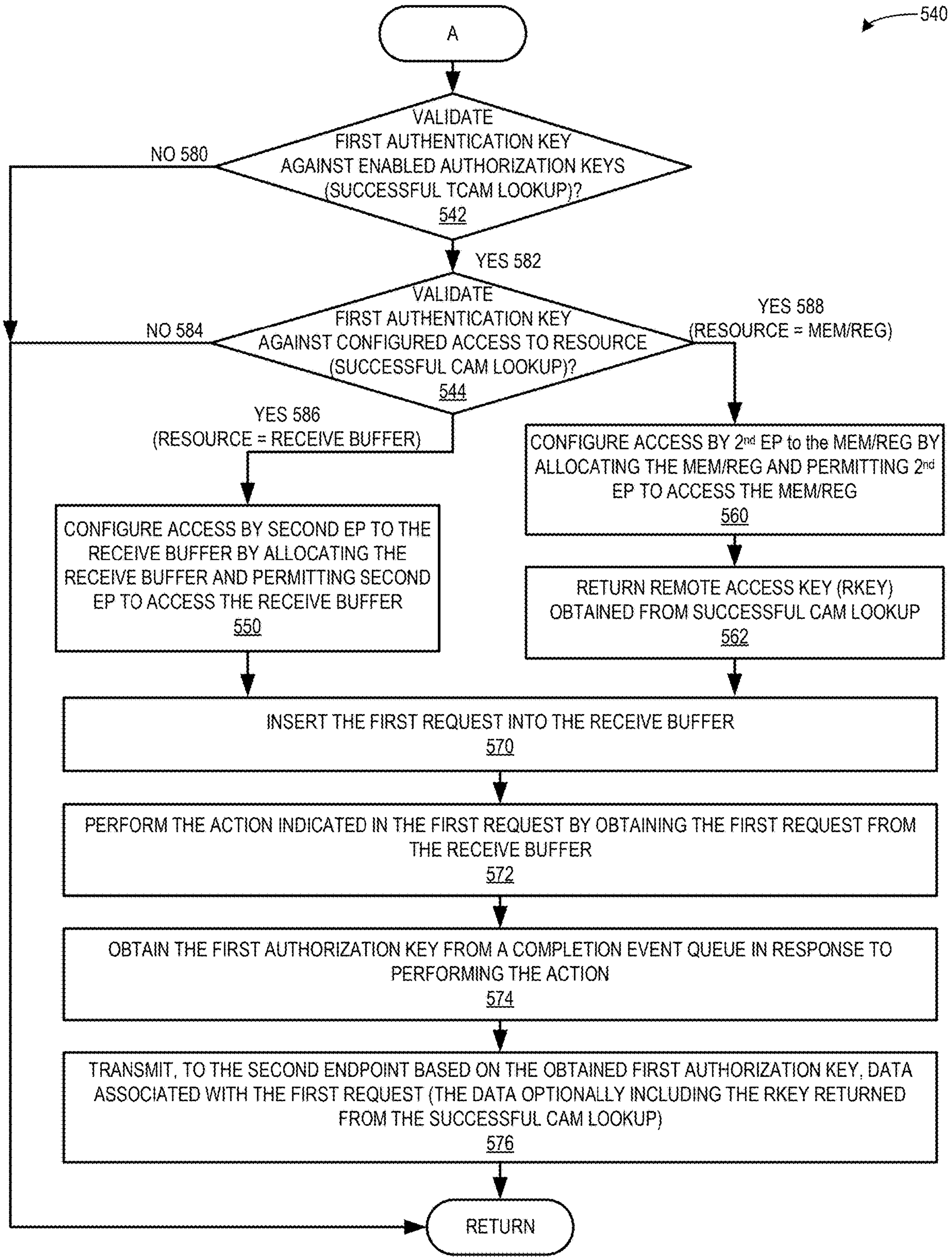
FIG. 5C presents a flowchart illustrating a method which facilitates enabling RDMA endpoint resource isolation in a connectionless environment, including validating an authentication key against configured access to a resource, in accordance with an aspect of the present application.

FIG. 5C presents a flowchart 540 illustrating a method which facilitates enabling RDMA endpoint resource isolation in a connectionless environment, including validating an authentication key against configured access to a resource, in accordance with an aspect of the present application. If the system is not successful in validating the first authentication key against the enabled authorization keys (e.g., by performing a unsuccessful TCAM lookup) (decision 542 and a "NO" result 580), the operation returns. In some aspects, the system may send an error message to the second EP (not shown). If the system is successful in validating the first authentication key against the enabled authorization keys (e.g., by performing a successful TCAM lookup) (decision 542 and a "YES" result 582), the operation continues at decision 544.

If the system is not successful in validating the first authentication key against the configured access to the resource (e.g., by performing an unsuccessful CAM lookup) (decision 544 and a "NO" result 584), the operation returns. If the system is successful in validating the first authentication key against the configured access to the resource (e.g., by performing a successful CAM lookup) (decision 544), and if the resource is a receive buffer (indicated by a "YES" 586), the system configures access by the second EP to the receive buffer by allocating the receive buffer and permitting the second EP to access the receive buffer (operation 550). For example, the system permits the second EP to access the receive buffer by performing a lookup in the CAM for the first authorization key as an associated authorization key for the receive buffer, as described above in relation to RX buffers 385 and 386 of FIG. 3B.

If the validation of decision 544 is successful and if the resource is a memory region ("mem/reg") (indicated by a "YES" 588), the system configures access by the second EP to the memory region by allocating the memory region and permitting the second EP to access the memory region (operation 560). For example, the system permits the second EP to access the memory region by performing a lookup in the CAM for the first authorization key as an associated authorization key for the memory region, as described above in relation to memory regions 346 of FIG. 3B. The system returns the remote access key (RKEY) obtained from the successful CAM lookup (operation 562), as described above in relation to the RKEYs associated with memory regions 387 and 388 and indicated in hardware as match entries 383 and 384.

Subsequent to operations 550 and 562, the system inserts the first request into the receive buffer (operation 570), as described above in relation to operation 210 of FIG. 2 and RX buffers 385 and 386 of FIG. 3B. The system performs the action indicated in the first request by obtaining the first request from the receive buffer (operation 572, similar to operation 508), as described above in relation to operation 214 by server EP 204 of FIG. 2. The system obtains the first authorization key from a completion event queue in response to performing the action (operation 574, similar to operations 510 and 512), as described above in relation to operation 216 of FIG. 2 and in relation to modifying or selecting the appropriate authorization key in outgoing RDMA operations. The system transmits, to the second endpoint based on the obtained first authorization key, data associated with the first request (the data optionally including the remote access key returned form the successful CAM lookup) (operation 576, similar to operation 514), as described above in relation to operation 218 (or combined operations 218 and 222) by server EP 204 in FIG. 2 as well as in relation to memory regions 346 of FIG. 3B and the communications of FIG. 4. Subsequently, the system may receive an RDMA request from the second EP, the RDMA request including the remote access key, and the system may allow the second EP to access the allocated memory region by validating and using the remote access key included in the RDMA request (not shown in FIG. 5C), as described above in relation to operation 424 of FIG. 4. The system can thus limit access to the resource based on the specific access key, such that an endpoint which attempts to access a given memory region without a successfully validated authentication key and configured RKEY may be restricted from accessing that given memory region, as indicated by a failure 428 of attempted communication 426 in FIG. 4.

Figure 6:
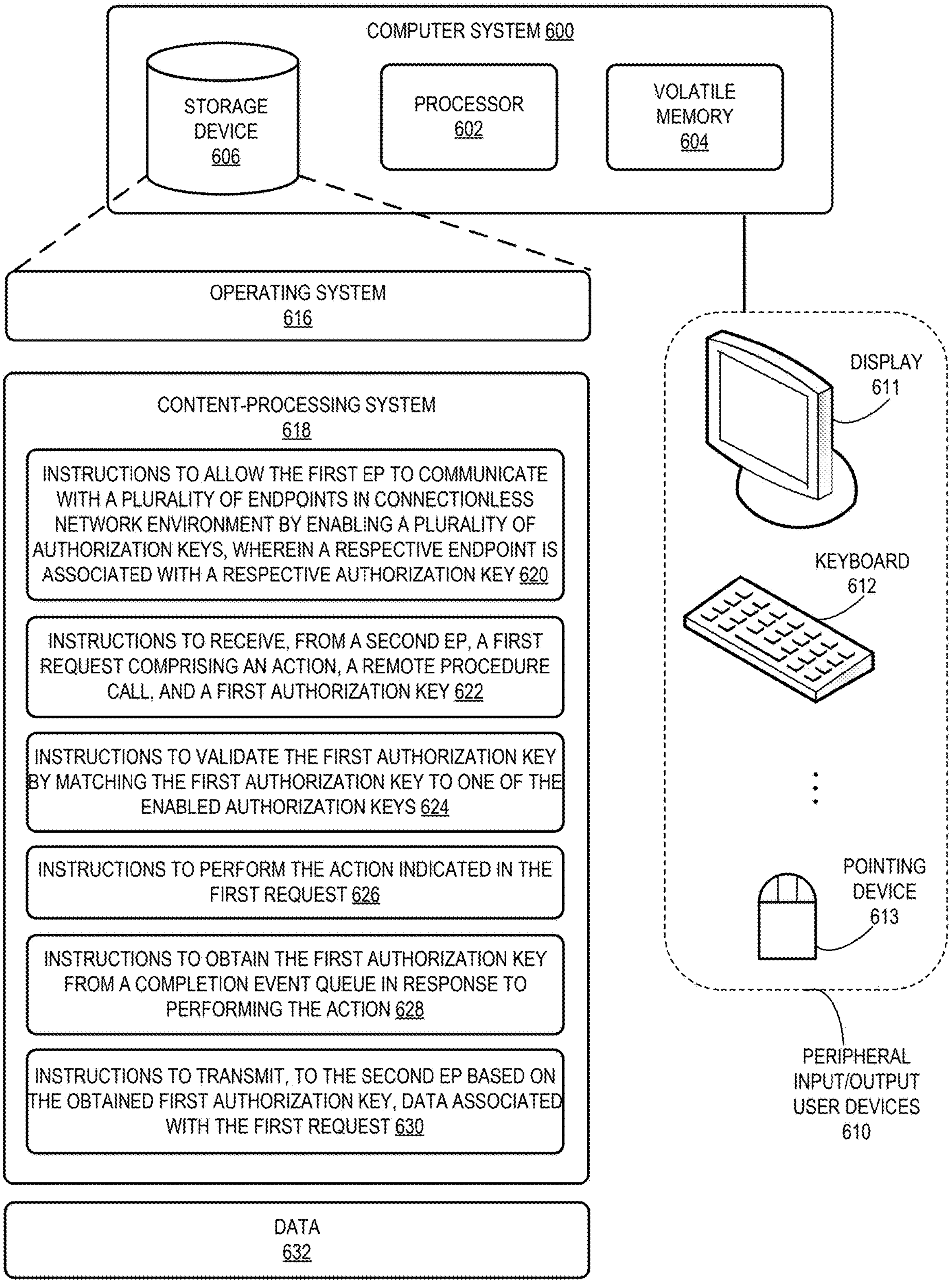
FIG. 6 illustrates a computer system which facilitates enabling RDMA endpoint resource isolation in a connectionless environment, in accordance with an aspect of the present application.

FIG. 6 illustrates a computer system 600 which facilitates enabling RDMA endpoint resource isolation in a connectionless environment, in accordance with an aspect of the present application. Computer system 600 includes a processor 602, a memory 604, and a storage device 606. Memory 604 may include a volatile memory (e.g., random access memory (RAM)) that serves as a managed memory and may be used to store one or more memory pools. Furthermore, computer system 600 may be coupled to peripheral input/output (I/O) user devices 610 (e.g., a display device 611, a keyboard 612, and a pointing device 613). Storage device 606 includes a non-transitory computer-readable storage medium and stores an operating system 616, a content-processing system 618, and data 632. Computer system 600 may be a first endpoint which communicates with other endpoints in a connectionless network environment and may include fewer or more entities or instructions than those shown in FIG. 6.

Content-processing system 618 may include instructions, which when executed by computer system 600, may cause computer system 600 to perform methods and/or processes described in this disclosure. Specifically, content-processing system 618 may include instructions 620 to allow the first endpoint to communicate with a plurality of endpoints in a connectionless network environment by enabling a plurality of authorization keys, wherein a respective endpoint of the plurality of endpoints is associated with a respective authorization key, as described above in relation to the configuration of authorization key rings 160 and 324 of, respectively, FIGS. 1 and 3A. Content-processing system 618 may include instructions 622 to receive, from a second endpoint of the plurality of endpoints, a first request comprising an action, a remote procedure call, and a first authorization key associated with the second endpoint, as described above in relation to communication 212 from client EP 202 to server EP 204 of FIG. 2.

Content-processing system 618 may include instructions 624 to validate the first authorization key by matching the first authorization key to one of the enabled authorization keys. For example, as described above in relation to FIG. 3A, hardware 302 (TCAM 312) may be programmed by software 304 with the authorization keys in authorization key ring 324, which may result in a subsequent lookup in label TCAM 312, thereby allowing hardware 302 to perform the validation and enforce the access constraints configured by software 304. Content-processing system 618 may include instructions 626 to perform the action indicated in the first request, as described above in relation to operation 214 by server EP 204 of FIG. 2. Content-processing system 618 may include instructions 628 to obtain the first authorization key from a completion event queue in response to performing the action, as described above in relation to operation 216 of FIG. 2 and in relation to modifying or selecting the appropriate authorization key in outgoing RDMA operations. Content-processing system 618 may include instructions 630 to transmit, to the second endpoint based on the obtained first authorization key, data associated with the first request, as described above in relation to operation 218 (or combined operations 218 and 222) by server EP 204 in FIG. 2.

Data 632 may include any data that is required as input or that is generated as output by the methods, operations, communications, and/or processes described in this disclosure. Specifically, data 632 may store at least: an authorization key; a handle corresponding to an authorization key; a wild card handle; a request; an RPC; a RDMA operation; a request which indicates an action, a type of remote operation, and an authorization key; a remote access key; a completion event queue; a CAM; a TCAM; an authorization key ring; an entry; a match entry; a result of a validation; a mapping; a mapping of an authorization key and a resource; a plurality of enabled authorization keys; a PID; a NID; and an indicator of a source including a receive buffer and a memory region.

Content-processing system 618 may include more instructions than those shown in FIG. 6. For example, content-processing system 618 may also store instructions for executing the operations described above in relation to: the environments of FIGS. 1, 3A, and 3B; the communications and operations of FIGS. 2 and 4; the operations depicted in the flowcharts of FIGS. 5A, 5B, and 50; and the instructions of computer-readable medium 700 in FIG. 7.

Figure 7:
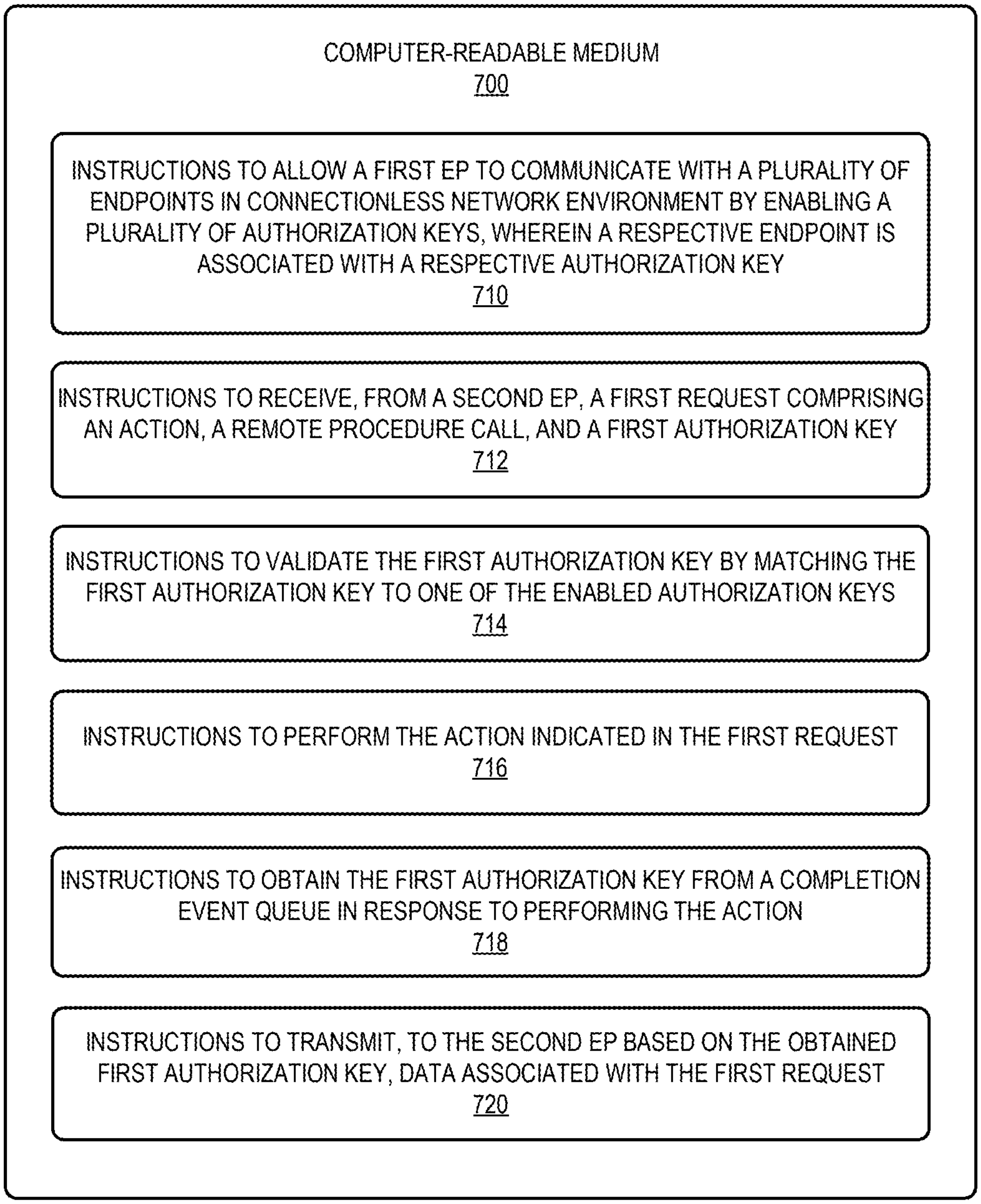
FIG. 7 illustrates a computer-readable medium which facilitates enabling RDMA endpoint resource isolation in a connectionless environment, in accordance with an aspect of the present application.

FIG. 7 illustrates a computer-readable medium (CRM) 700 which facilitates enabling RDMA endpoint resource isolation in a connectionless environment, in accordance with an aspect of the present application. CRM 700 may be a non-transitory computer-readable medium or device storing instructions that when executed by a computer or processor cause the computer or processor to perform a method. CRM 700 may store instructions 710 to allow a first endpoint to communicate with a plurality of endpoints in a connectionless network environment by enabling, by the first endpoint, a plurality of authorization keys, a respective endpoint of the plurality of endpoints being associated with a respective authorization key, as described above in relation to the configuration of authorization key rings 160 and 324 of, respectively, FIGS. 1 and 3A. CRM 700 may additionally store instructions 712 to receive, by the first endpoint from a second endpoint of the plurality of endpoints, a first request comprising an action, a remote procedure call, and a first authorization key associated with the second endpoint, as described above in relation to communication 212 from client EP 202 to server EP 204 of FIG. 2.

CRM 700 may also store instructions 714 to validate the first authorization key by matching the first authorization key to one of the enabled authorization keys, e.g., as described above in relation to FIG. 3A. CRM 700 may store instructions 716 to perform the action indicated in the first request, as described above in relation to operation 214 by server EP 204 of FIG. 2. CRM 700 may store instructions 718 to obtain the first authorization key from a completion event queue in response to performing the action, as described above in relation to operation 216 of FIG. 2 and in relation to modifying or selecting the appropriate authorization key in outgoing RDMA operations. CRM 700 may additionally store instructions 720 to transmit, to the second endpoint based on the obtained first authorization key, data associated with the first request, as described above in relation to operation 218 (or combined operations 218 and 222) by server EP 204 in FIG. 2.

CRM 700 may include more instructions than those shown in FIG. 7. For example, CRM 700 may also store instructions for executing the operations described above in relation to: the environments of FIGS. 1, 3A, and 3B; the communications and operations of FIGS. 2 and 4; the operations depicted in the flowcharts of FIGS. 5A, 5B, and 5C; and the instructions of content-processing system 618 in FIG. 6.

In general, the disclosed aspects provide a method, a computer system, and a computer-readable medium (CRM) which facilitate enabling RDMA endpoint resource isolation in a connectionless environment. During operation, the system allows a first endpoint to communicate with a plurality of endpoints in a connectionless network environment by enabling, by the first endpoint, a plurality of authorization keys, a respective endpoint of the plurality of endpoints being associated with a respective authorization key. The system receives, by the first endpoint from a second endpoint of the plurality of endpoints, a first request comprising an action, a remote procedure call, and a first authorization key associated with the second endpoint. The system validates the first authorization key by matching the first authorization key to one of the enabled authorization keys. The system performs the action indicated in the first request. Responsive to performing the action, the system returns the first authorization key to a completion event queue. The system obtains the first authorization key from the completion event queue. The system transmits, to the second endpoint based on the obtained first authorization key, data associated with the first request.

In a variation on this aspect, the system enables the plurality of authorization keys by mapping, by the first endpoint, the authorization keys to corresponding handles and programming a ternary content-addressable memory (TCAM) with the authorization keys.

In a further variation on this aspect, the first authorization key included in the first request comprises a handle. The system validates the first authorization key further by performing, based on the handle for the first authorization key, a lookup in the TCAM.

In a further variation, the system configures, by the first endpoint, access to a resource by mapping the resource to one or more associated authorization keys. The system programs a content-addressable memory (CAM) by mapping, in the CAM, the resource to the associated authorization keys.

In a further variation, the system programs the CAM further by mapping, in the CAM, the resource and the first authorization key to a same process identifier associated with the first endpoint and the second endpoint.

In a further variation, the resource comprises a receive buffer of the first endpoint. The system validates access by the second endpoint to the receive buffer by performing a lookup in the CAM for the first authorization key as an associated authorization key for the receive buffer. The system configures access by the second endpoint to the receive buffer by allocating the receive buffer and permitting the second endpoint to access the receive buffer. The system inserts the first request into the receive buffer. The system performs the action indicated in the first request by obtaining the first request from the receive buffer.

In a further variation, the receive buffer is associated with at least one of: a single authorization key; multiple authorization keys; or any authorization key based on a wildcard handle.

In a further variation, the resource comprises a first memory region associated with the first endpoint. The system configures access to the resource further by mapping the resource to the first authorization key and a remote access key. The system programs the CAM further by mapping, in the CAM, the resource to the first authorization key and the remote access key.

In a further variation, the system validates access by the second endpoint to the first memory region by performing a lookup in the CAM for the first authorization key as an associated authorization key for the first memory region. The system obtains the remote access key based on the lookup in the CAM. The system configures access by the second endpoint to the first memory region by allocating the first memory region and permitting the second endpoint to access the first memory region. The system returns the remote access key to the second endpoint. The system receives, by the first endpoint from the second endpoint, a remote direct memory access (RDMA) request including the remote access key. The system allows the second endpoint to access the allocated first memory region by using the remote access key included in the RDMA request.

In a further variation, the first endpoint is associated with a server, and the plurality of endpoints are associated with clients.

In a further variation, transmitting the data associated with the first request comprises selecting the obtained first authorization key.

In a further variation, the system transmits all data associated with the first request, wherein the data includes a notification that the requested data has been transmitted.

In a further variation, the system transmits all data associated with the first request. Subsequent to transmitting all the data associated with the first request, the system transmits a close response message indicating that the requested data has been transmitted.

In another aspect, a computer system comprises a processor and a storage device storing instructions which when executed by the processor comprise instructions to perform operations. The instructions are to allow the first endpoint to communicate with a plurality of endpoints in a connectionless network environment by enabling a plurality of authorization keys, wherein a respective endpoint of the plurality of endpoints is associated with a respective authorization key. The instructions are further to receive, from a second endpoint of the plurality of endpoints, a first request comprising an action, a remote procedure call, and a first authorization key associated with the second endpoint. The instructions are further to validate the first authorization key by matching the first authorization key to one of the enabled authorization keys. The instructions are further to perform the action indicated in the first request and obtain the first authorization key from a completion event queue in response to performing the action. The instructions are further to transmit, to the second endpoint based on the obtained first authorization key, data associated with the first request. The computer system may include a content-processing system which includes more instructions, e.g., the instructions to perform the operations described herein, including in relation to: the environments of FIGS. 1, 3A, and 3B; the communications and operations of FIGS. 2 and 4; the operations depicted in the flowcharts of FIGS. 5A, 5B, and 50; and the instructions of computer-readable medium 700 in FIG. 7.

In yet another aspect, a non-transitory computer-readable storage medium (CRM) stores instructions to allow a first endpoint to communicate with a plurality of endpoints in a connectionless network environment by enabling, by the first endpoint, a plurality of authorization keys, a respective endpoint of the plurality of endpoints being associated with a respective authorization key. The instructions are further to receive, by the first endpoint from a second endpoint of the plurality of endpoints, a first request comprising an action, a remote procedure call, and a first authorization key associated with the second endpoint. The instructions are further to validate the first authorization key by matching the first authorization key to one of the enabled authorization keys. The instructions are further to perform the action indicated in the first request and obtain the first authorization key from a completion event queue in response to performing the action. The instructions are further to transmit, to the second endpoint based on the obtained first authorization key, data associated with the first request. The CRM may also store instructions for executing the operations described above in relation to: the environments of FIGS. 1, 3A, and 3B; the communications and operations of FIGS. 2 and 4; the operations depicted in the flowcharts of FIGS. 5A, 5B, and 5C; and the instructions of content-processing system 618 in FIG. 6.

The foregoing description is presented to enable any person skilled in the art to make and use the aspects and examples, and is provided in the context of a particular application and its requirements. Various modifications to the disclosed aspects will be readily apparent to those skilled in the art, and the general principles defined herein may be applied to other aspects and applications without departing from the spirit and scope of the present disclosure. Thus, the aspects described herein are not limited to the aspects shown, but are to be accorded the widest scope consistent with the principles and features disclosed herein.

Furthermore, the foregoing descriptions of aspects have been presented for purposes of illustration and description only. They are not intended to be exhaustive or to limit the aspects described herein to the forms disclosed. Accordingly, many modifications and variations will be apparent to practitioners skilled in the art. Additionally, the above disclosure is not intended to limit the aspects described herein. The scope of the aspects described herein is defined by the appended claims.

What is claimed is:

1. A method, comprising:

allowing a first endpoint to communicate with a plurality of endpoints in a connectionless network environment by enabling, by the first endpoint, a plurality of authorization keys, a respective endpoint of the plurality of endpoints being associated with a respective authorization key;

receiving, by the first endpoint from a second endpoint of the plurality of endpoints, a first request comprising an action, a remote procedure call, and a first authorization key associated with the second endpoint;

validating the first authorization key by matching the first authorization key to one of the enabled authorization keys;

performing the action indicated in the first request in response to successfully validating the first authorization key;

responsive to performing the action, returning the first authorization key to a completion event queue;

obtaining the first authorization key from the completion event queue; and transmitting, to the second endpoint based on the obtained first authorization key, data associated with the first request.

2. The method of claim 1, wherein enabling the plurality of authorization keys comprises:

mapping, by the first endpoint, the plurality of authorization keys to corresponding handles; and programming a ternary content-addressable memory (TCAM) with the plurality of authorization keys.

3. The method of claim 2, wherein the first authorization key included in the first request comprises a handle, and wherein the method further comprises:

validating the first authorization key further by performing, based on the handle for the first authorization key, a lookup in the TCAM.

4. The method of claim 1, further comprising:

configuring, by the first endpoint, access to a resource by mapping the resource to one or more associated authorization keys; and programming a content-addressable memory (CAM) by mapping, in the CAM, the resource to the one or more associated authorization keys.

5. The method of claim 4, programming the CAM further by mapping, in the CAM, the resource and the first authorization key to a same process identifier associated with the first endpoint and the second endpoint.

6. The method of claim 4, wherein the resource comprises a receive buffer of the first endpoint, and wherein the method further comprises:

validating access by the second endpoint to the receive buffer by performing a lookup in the CAM for the first authorization key as an associated authorization key for the receive buffer;

configuring access by the second endpoint to the receive buffer by allocating the receive buffer and permitting the second endpoint to access the receive buffer;

inserting the first request into the receive buffer; and performing the action indicated in the first request by obtaining the first request from the receive buffer.

7. The method of claim 6, wherein the receive buffer is associated with at least one of:

a single authorization key;

multiple authorization keys; or any authorization key based on a wildcard handle.

8. The method of claim 4, wherein the resource comprises a first memory region associated with the first endpoint, and wherein the method further comprises:

configuring access to the resource further by mapping the resource to the first authorization key and a remote access key; and programming the CAM further by mapping, in the CAM, the resource to the first authorization key and the remote access key.

9. The method of claim 8, further comprising:

validating access by the second endpoint to the first memory region by performing a lookup in the CAM for the first authorization key as an associated authorization key for the first memory region;

obtaining the remote access key based on the lookup in the CAM;

configuring access by the second endpoint to the first memory region by allocating the first memory region and permitting the second endpoint to access the first memory region;

returning the remote access key to the second endpoint;

receiving, by the first endpoint from the second endpoint, a remote direct memory access (RDMA) request including the remote access key; and allowing the second endpoint to access the allocated first memory region by using the remote access key included in the RDMA request.

10. The method of claim 1, wherein the first endpoint is associated with a server, and wherein the plurality of endpoints are associated with clients.

11. The method of claim 1, wherein transmitting the data associated with the first request comprises selecting the obtained first authorization key.

12. The method of claim 1, further comprising:

transmitting all data associated with the first request, wherein the data includes a notification that the requested data has been transmitted.

13. The method of claim 1, further comprising:

transmitting all data associated with the first request; and subsequent to transmitting all the data associated with the first request, transmitting a close response message indicating that the requested data has been transmitted.

14. A computer system comprising a first endpoint and further comprising:

a processor; and a storage device storing instructions which when executed by the processor comprise instructions to:

allow the first endpoint to communicate with a plurality of endpoints in a connectionless network environment by enabling a plurality of authorization keys, wherein a respective endpoint of the plurality of endpoints is associated with a respective authorization key;

receive, from a second endpoint of the plurality of endpoints, a first request comprising an action, a remote procedure call, and a first authorization key associated with the second endpoint;

validate the first authorization key by matching the first authorization key to one of the enabled authorization keys;

perform the action indicated in the first request in response to successfully validating the first authorization key;

obtain the first authorization key from a completion event queue in response to performing the action; and transmit, to the second endpoint based on the obtained first authorization key, data associated with the first request.

15. The computer system of claim 14, wherein the instructions to enable the plurality of authorization keys are further to:

map the plurality of authorization keys to corresponding handles; and program a ternary content-addressable memory (TCAM) of the first endpoint with the plurality of authorization keys, wherein the first authorization key included in the first request comprises a handle, and wherein the instructions to validate the first authorization key are further to perform, based on the handle for the first authorization key, a lookup in the TCAM.

16. The computer system of claim 14, the instructions further to:

configure access to a resource by mapping the resource to one or more associated authorization keys and, in response to the resource comprising a memory region, a remote access key corresponding to the memory region resource; and program a content-addressable memory (CAM) by mapping, in the CAM, the resource to the one or more associated authorization keys and, in response to the resource comprising a memory region, the remote access key;

wherein subsequent to receiving the first request and validating the first authorization key by matching the first authorization key to one of the enabled authorization keys, the instructions are further to validate the first authorization key against the configured access to the resource in the CAM.

17. The computer system of claim 16, wherein the resource comprises a receive buffer associated with at least one of a single authorization key, multiple authorization keys, or any authorization key based on a wildcard handle, and wherein the instructions are further to:

configure access by the second endpoint to the receive buffer by allocating the receive buffer and permitting the second endpoint to access the receive buffer; and insert the first request into the receive buffer, wherein the instructions to perform the action indicated in the first request are further to obtain the first request from the receive buffer.

18. The computer system of claim 16, wherein the resource comprises a first memory region associated with the first endpoint, wherein the instructions to validate the first authorization key against the configured access to the resource in the CAM are further to perform a lookup in the CAM for the first authorization key as an associated authorization key for the first memory region, and wherein the instructions are further to:

obtain the remote access key based on the lookup in the CAM;

configure access by the second endpoint to the first memory region by allocating the first memory region and permitting the second endpoint to access the first memory region;

return, to the second endpoint, the remote access key obtained from the lookup in the CAM;

receive, from the second endpoint, a remote direct memory access (RDMA) request including the remote access key; and allow the second endpoint to access the allocated first memory region by using the remote access key included in the RDMA request.

19. A non-transitory computer-readable medium storing instructions to:

allow a first endpoint to communicate with a plurality of endpoints in a connectionless network environment by enabling, by the first endpoint, a plurality of authorization keys, a respective endpoint of the plurality of endpoints being associated with a respective authorization key;

receive, by the first endpoint from a second endpoint of the plurality of endpoints, a first request comprising an action, a remote procedure call, and a first authorization key associated with the second endpoint;

validate the first authorization key by matching the first authorization key to one of the enabled authorization keys;

perform the action indicated in the first request in response to successfully validating the first authorization key;

obtain the first authorization key from a completion event queue in response to performing the action; and transmit, to the second endpoint based on the obtained first authorization key, data associated with the first request.

20. The non-transitory storage medium of claim 19, the instructions further to:

program a ternary content-addressable memory (TCAM) with the plurality of authorization keys;

validate the first authorization key further by performing, based on a handle for the first authorization key, a lookup in the TCAM;

configure access to a resource by mapping the resource to one or more associated authorization keys and, in response to the resource comprising a memory region, a remote access key corresponding to the memory region;

program a content-addressable memory (CAM) by mapping, in the CAM, the resource to the one or more associated authorization keys and, in response to the resource comprising a memory region, the remote access key;

subsequent to validating the first authorization key by performing the lookup in the TCAM, validating the first authorization key against the configured access to the resource by performing a lookup in the CAM; and configure access by the second endpoint to the resource by allocating the resource and permitting the second endpoint to access the resource, wherein the resource comprises at least one of a receive buffer and a memory region, and wherein in response to the resource comprising the memory region, the instructions are further to:

obtain the remote access key based on the lookup in the CAM;

return to the second endpoint the obtained remote access key;

receive, from the second endpoint, a remote direct memory access (RDMA) request including the remote access key; and allow the second endpoint to access the memory region by using the remote access key included in the RDMA request.

* * * * *